US011154450B2

(12) United States Patent
Soucy et al.

(10) Patent No.: US 11,154,450 B2
(45) Date of Patent: Oct. 26, 2021

(54) EXOSKELETON STRUCTURE

(71) Applicants: SAFRAN ELECTRONICS & DEFENSE, Boulogne-Billancourt (FR); B-TEMIA INC., Québec (CA)

(72) Inventors: Francisco Soucy, Québec (CA); Nathaniel Zoso, Québec (CA); Sylvain Gagne, Québec (CA); Alexandre Belanger-Desbiens, Québec (CA); Jordane Grenier, Boulogne-Billancourt (FR)

(73) Assignees: SAFRAN ELECTRONICS & DEFENSE, Boulogne-Billancourt (FR); B-TEMIA INC., Quebec (CA)

( * ) Notice: Subject to any disclaimer, the term of this patent is extended or adjusted under 35 U.S.C. 154(b) by 0 days.

(21) Appl. No.: 16/958,407

(22) PCT Filed: Dec. 28, 2018

(86) PCT No.: PCT/EP2018/097085
§ 371 (c)(1),
(2) Date: Jun. 26, 2020

(87) PCT Pub. No.: WO2019/129856
PCT Pub. Date: Jul. 4, 2019

(65) Prior Publication Data
US 2021/0052460 A1    Feb. 25, 2021

(30) Foreign Application Priority Data
Dec. 28, 2017  (FR) ........................................ 1763301

(51) Int. Cl.
*A61H 3/00*   (2006.01)
*A61H 1/02*   (2006.01)

(52) U.S. Cl.
CPC ............ *A61H 3/00* (2013.01); *A61H 1/0262* (2013.01); *A61H 2003/007* (2013.01);
(Continued)

(58) Field of Classification Search
CPC .. A61H 3/00; A61H 1/0262; A61H 2003/007; A61H 2201/1215;
(Continued)

(56) References Cited

U.S. PATENT DOCUMENTS

| 2017/0360645 | A1 | 12/2017 | Sodeyama et al. | |
| 2018/0125738 | A1* | 5/2018 | Witte | A61H 1/0266 |
| 2018/0160946 | A1* | 6/2018 | Macko | A61B 5/1122 |

FOREIGN PATENT DOCUMENTS

| CN | 103610524 A | 3/2014 |
| EP | 2944438 A1 | 11/2015 |

(Continued)

OTHER PUBLICATIONS

Written Opinion issued in PCT/EP2018/097085 dated Apr. 15, 2019, 16 pages in English and French.
(Continued)

*Primary Examiner* — Jerrah Edwards
*Assistant Examiner* — Aren Patel
(74) *Attorney, Agent, or Firm* — Sughrue Mion, PLLC

(57) ABSTRACT

An exoskeleton structure includes a leg part to be fastened to a leg of a user, a foot part to be fastened to a foot of a user, a mechanical linking assembly linking the leg part to the foot part, and including a first pivot allowing the foot part to rotate relative to the leg part about a first axis when the foot of the user makes an internal/external rotation movement relative to the leg, and a second pivot allowing the foot part to rotate relative to the leg part about a second axis when the foot of the user makes a pronation/supination movement relative to the leg. The first pivot is at a height greater than or equal to 20 centimetres from the ground, and the distance between the first axis of rotation and the second axis of rotation is less than or equal to 5 centimetres.

21 Claims, 3 Drawing Sheets

Figure 1:
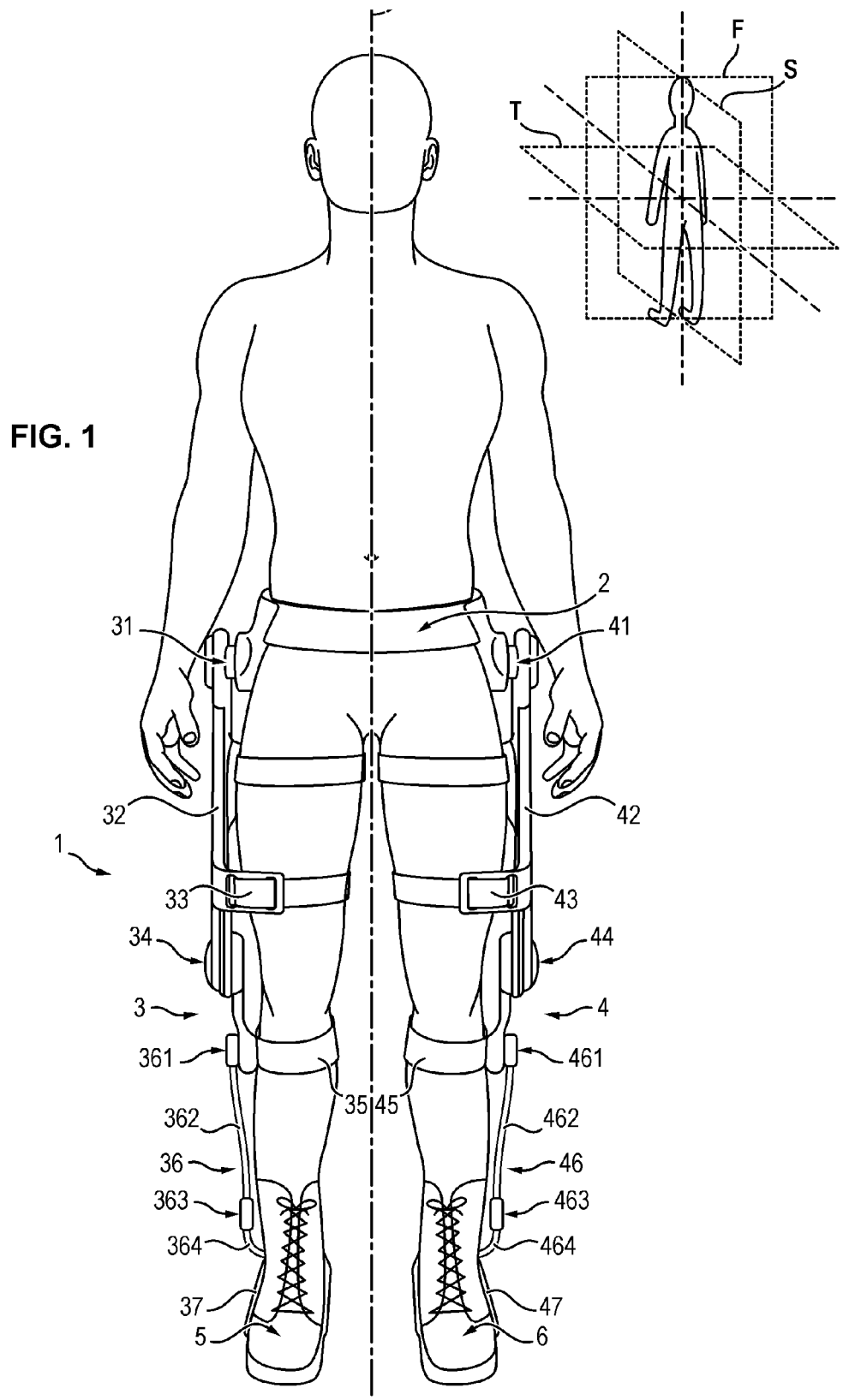

(52) U.S. Cl.
CPC ............... *A61H 2201/1215* (2013.01); *A61H 2201/1642* (2013.01); *A61H 2201/1652* (2013.01); *A61H 2201/1671* (2013.01); *A61H 2201/1673* (2013.01); *A61H 2201/1676* (2013.01); *A61H 2205/12* (2013.01)

(58) Field of Classification Search
CPC .... A61H 2201/1642; A61H 2201/1652; A61H 2201/1671; A61H 2201/1673; A61H 2201/1676; A61H 2205/12
See application file for complete search history.

(56) References Cited

FOREIGN PATENT DOCUMENTS

| | | | |
|---|---|---|---|
| JP | 2015-144787 A | 8/2015 | |
| KR | 10-2013-0045777 A | 5/2013 | |

OTHER PUBLICATIONS

International Search Report in International Application No. PCT/EP2018/097085, dated Apr. 15, 2019.
French Preliminary Search Report in French Application No. FR1763301, dated Nov. 14, 2018.

\* cited by examiner

EXOSKELETON STRUCTURE

CROSS REFERENCE TO RELATED APPLICATIONS

This application is a National Stage of International Application No. PCT/EP2018/097085, filed Dec. 28, 2018, claiming priority to French Patent Application No. 1763301, filed Dec. 28, 2017, the entire contents of each of which are incorporated by reference herein in their entireties.

FIELD OF THE INVENTION

The invention relates to an exoskeleton structure.

Etat De La Technique

Force assist exoskeletons are mechanical structures which duplicate the structure of the human skeleton and which allow improving the physical capacities of the human body. There exist different types of force assist exoskeletons, which depend on the tasks to be accomplished by the user. Each type of exoskeleton allows limiting or reducing the force supplied by the user during the accomplishment of certain tasks.

However, the user must support the weight of the exoskeleton structure when this weight is not transferred to the ground, which has the consequence of limiting the freedom of movement of the user and generating an additional load which is necessarily transferred to the lower body of the user.

For a user, moreover, it can be difficult to put on or to remove the exoskeleton structure.

SUMMARY OF THE INVENTION

One goal of the invention is to propose an exoskeleton structure which is more comfortable and which hinders the movements of the user as little as possible.

This goal is achieved within the scope of the present invention thanks to an exoskeleton structure comprising:
  a leg part intended to be fastened to a leg of a user,
  a foot part intended to be fastened to a foot of a user,
  a mechanical linking assembly connecting the leg part to the foot part, comprising a first pivot allowing rotation of the foot part relative to the leg part around a first axis of rotation during an internal/external rotation movement of the foot of the user, and a second pivot allowing rotation of the foot part relative to the leg part around a second axis of rotation during an eversion/inversion movement of the ankle of the user,
in which the first pivot is arranged so that the first pivot is positioned on one side of the leg part, the leg part being located between a sagittal plane of the user and the first pivot, and the first pivot positioned at a height greater than or equal to 20 centimeters from the ground when the user is standing on the ground, in a reference anatomical position, the first axis of rotation being oriented so that the distance between the first axis of rotation and the second axis of rotation is less than or equal to 5 centimeters.

Recall that a "distance between two axes" is defined as the smallest distance which separates two points located respectively on each of the two axes.

The invention is based on the observation that when positioning the first pivot sufficiently far from the ankle of the user (i.e. at a certain height from the ground), it is possible to arrange the first axis of rotation so that it is as close as possible to the real center of rotation of the ankle. In particular, the first axis of rotation is positioned so as to be sufficiently close to the second axis of rotation (i.e. with a distance between the axes less than or equal to 5 centimeters) so as to reproduce as faithfully as possible the degrees of freedom of the ankle and thus obtain a more comfortable exoskeleton structure.

In addition, the first pivot is positioned on one side of the leg part so that the leg part is located between a sagittal plane of the user and the first pivot.

This disposition of the first pivot allows freeing the space located in front of the tibia of the user, as well as the internal space of the leg. In this manner, the exoskeleton structure can be put on and removed more easily. In addition, this limits the risks of interference between the exoskeleton structure and the other foot of the user during walking.

Moreover, this arrangement allows a lighter and less bulky design of the different parts of the structure.

In a preferred embodiment of the invention, the first axis of rotation is oriented so that it intersects the second axis of rotation (i.e. the distance between the axes is zero). The first axis of rotation and the second axis of rotation being concurrent, they allow preserving the degrees of freedom of the ankle.

The proposed exoskeleton structure can further have the following features:
  the first axis of rotation is oriented so that it forms a first nonzero angle relative to a vertical direction when the user is standing, in the reference anatomical position, the first angle being comprised between 1 and 30 degrees, preferably between 10 and 15 degrees, for example equal to 12 degrees,
  the mechanical linking assembly comprises a third pivot allowing rotation of the foot part relative the leg part around a third axis of rotation during a flexure/extension movement of the ankle of the user,
  the third pivot is positioned at a height less than the height of the malleolus of the user when the user is standing, in the anatomical reference position,
  the third pivot is positioned toward the back of the foot of the user relative to the malleolus of the user,
  the first axis of rotation is oriented so that the distance between the first axis of rotation and the third axis of rotation is less than or equal to 5 centimeters,
  the third axis of rotation is oriented so that it cuts the third axis of rotation,
  the third axis of rotation is oriented so that it forms a second nonzero angle with a frontal plane of the user when the user is standing, in the anatomical reference position, the second angle being comprised between 1 and 15 degrees, preferably between 4 and 7 degrees, for example equal to 6 degrees,
  the third axis of rotation is oriented so that it forms a third nonzero angle with a transverse plane of the user when the user is standing, in the anatomical reference position, the angle being comprised between 5 and 15 degrees, preferably between 6 and 8 degrees, for example equal to 8 degrees,
  the mechanical linking assembly comprises a linking part having a first end connected to the leg part via the first pivot and a second end connected to the third pivot, the linking part comprising two portions mounted sliding relative to one another in order to adjust a length of the linking part, and a locking device to lock the two portions relative to one another once the length is adjusted, the second axis of rotation is oriented so that it forms a fourth nonzero angle relative to a horizontal direction when the user is standing, in the anatomical reference position, the angle being comprised between 1 and 30 degrees, preferably between 15 and 25 degrees, for example 18 degrees, the second axis of rotation is oriented so that it passes below the malleolus of the user when the user is standing, in the anatomical reference position, the second axis of rotation is oriented downward when the second axis of rotation is followed from the back of the foot toward the front of the foot of the user, when the user is standing in the anatomical reference position.

PRESENTATION OF THE DRAWINGS

Figure 3:
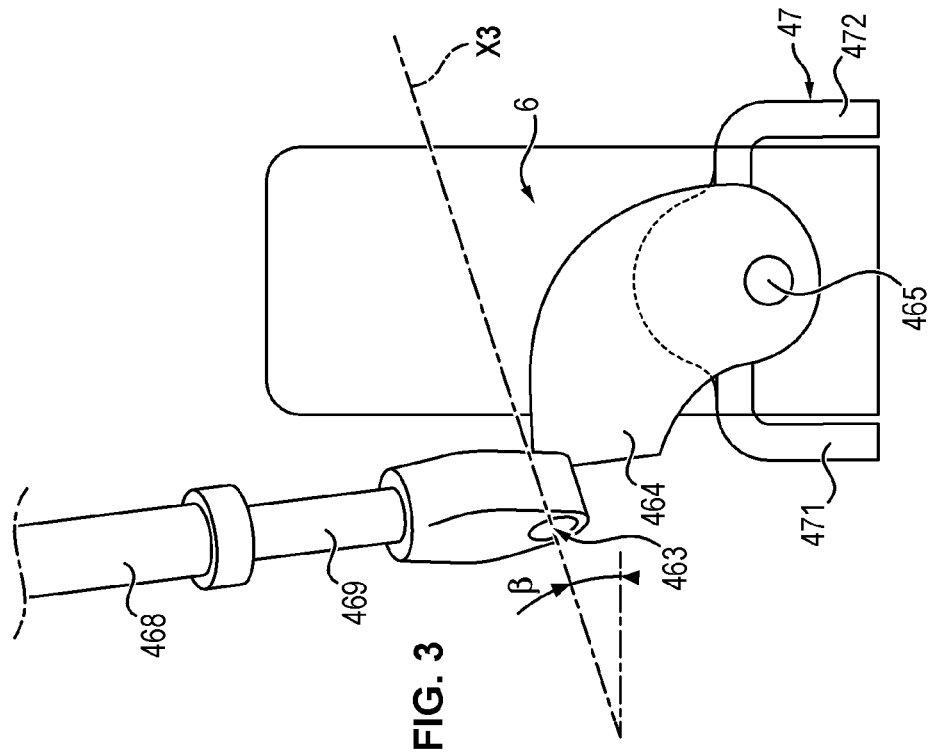
Figure 2:
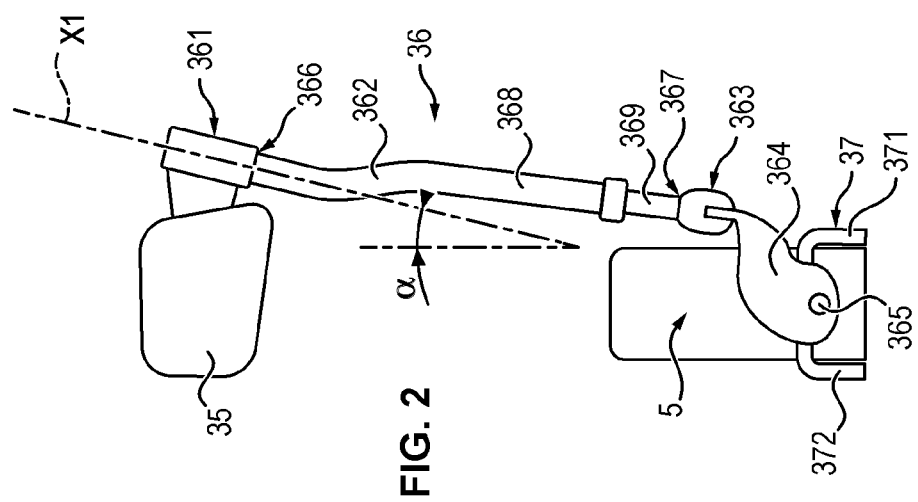
Figure 5:
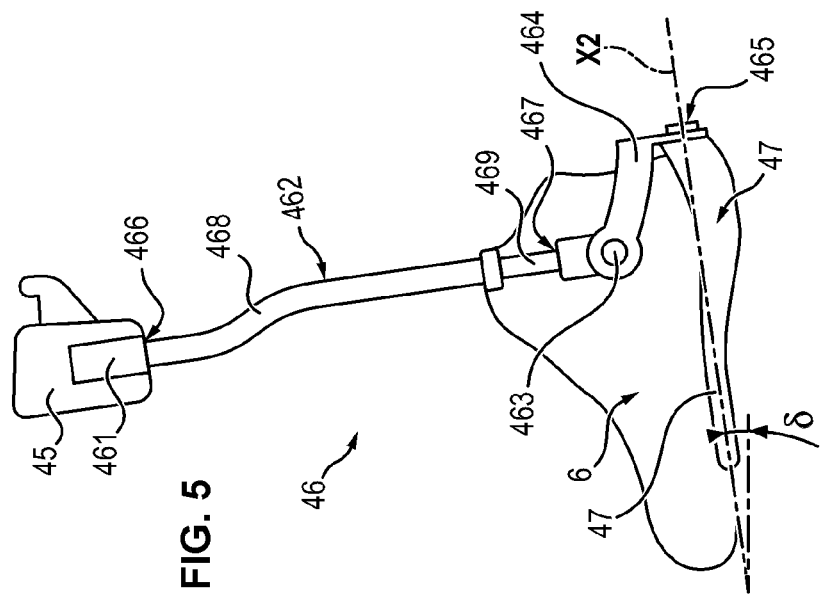
Figure 4:
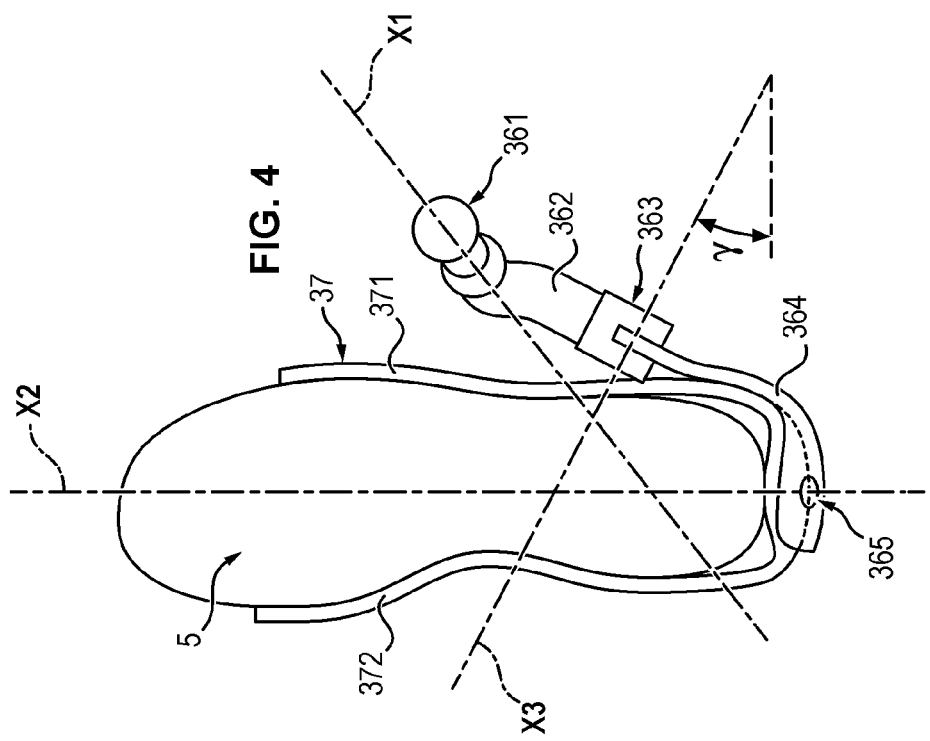

Other features and advantages will be revealed by the description that follows, which is purely illustrative and not limiting, and must be read with reference to the appended figures, in which:

FIG. 1 show schematically in front view a user equipped with an exoskeleton structure conforming to one embodiment of the invention, FIG. 2 shows schematically, in back view, a portion of the exoskeleton structure of FIG. 1, FIG. 3 shows schematically, in back view, a portion of the exoskeleton structure of FIG. 1, FIG. 4 shows schematically, in top view, a portion of the exoskeleton structure of FIG. 1, and FIG. 5 shows schematically, in side view, a portion of the exoskeleton structure of FIG. 1.

DETAILED DESCRIPTION OF ONE EMBODIMENT

FIG. 1 shows schematically a user standing on a horizontal ground, in the anatomical reference position (also called "reference position" or "standard anatomical position") according to the reference system in anatomy.

FIG. 1 includes, moreover, a diagram illustrating a frontal plane F, a sagittal plane S and a transverse plane T of the user. In known manner, the sagittal plane S is defined as a plane parallel to the median plane which separates the left half from the right half of the body of the user. The frontal plane F or coronal plane is defined as a plane perpendicular to the medial plane and which separates the body into an anterior or ventral portion and a posterior or dorsal portion. The transverse plane T or transversal plane is defined as a plane perpendicular to the median plane and which separates the body into an upper portion (on the head side) and a lower portion (on the foot side).

In FIG. 1, the user is equipped with a force assistance exoskeleton structure 1, for assisting the user during movements of his lower members.

The exoskeleton structure 1 illustrated in FIG. 1 comprises a lumbar belt 2 able to surround the waist of the user, a first lower member assembly 3 and a second lower member assembly 4.

The lumbar belt 2 is arranged around the waist of the user, supported on the hips of the user. The lumbar belt 2 can support a battery and a control unit (not shown) fastened to the lumbar belt. The battery allows supplying electrical energy to the different actuators of the structure. The control unit is programmed to control the different actuators.

The first lower member assembly 3 extends along a first lower member of the user (in the example of FIG. 1, the first lower member assembly extends along the right lower member of the user) and is connected to the lumbar belt 2 by means of a first hip pivot 31 (located on the right side of the user).

The first lower member assembly 3 comprises the first hip pivot 31, a first femoral part 32 suitable for extending along the right thigh of the user, a first thigh part 33 suitable for being fastened to the right thigh of the user, a first knee pivot 34, a first leg part 35 suitable for being fastened to the right leg of the user, a first mechanical linking assembly 36 and a first foot part 37 suitable for being fastened to the right foot of the user.

The first hip pivot 31 allows rotation of the first femoral part 32 relative to the lumbar belt 2 during a flexure/extension movement of the right thigh of the user relative to the pelvis.

The first lower member assembly 3 can further comprise, integrated with the first hip pivot 31, a hip actuator comprising a stator and a rotor suitable for being driven in rotation relative to the stator to drive in rotation the tibial part 32 relative to the lumbar belt 2 during a flexure or extension movement of the right hip joint.

The first knee pivot 34 connects the first femoral part 32 to the first leg part 35. The knee pivot 34 allows rotation of the leg part 35 relative to the femoral part 32 during a flexure/extension movement of the right knee joint.

The first lower member assembly 3 can further comprise, integrated with the first knee pivot 34, a knee actuator comprising a stator and a rotor suitable for being driven in rotation relative to the stator to drive in rotation the leg part 35 relative to the femoral part 32 during a flexure or extension movement of the right knee joint.

As illustrated in FIG. 2, the first linking assembly 36 comprises a pivot 361, a tibial part 362, a pivot 363, an intermediate part 364 and a pivot 365.

The tibial part 362 extends along the calf of the user, between the leg part 35 and the intermediate part 364. The tibial part 362 has a first end 366 and a second end 367.

The leg part 35 is connected to the tibial part 362 by means of the pivot 361. More precisely, the leg part 35 is connected to the first end 366 of the tibial part 362 by means of the pivot 361. The pivot 361 allows rotation of the tibial part 362 relative to the leg part 35 around an axis of rotation X1, during an internal/external rotation movement of the foot of the user relative to the leg.

The intermediate part 364 extends between the tibial part 362 and the foot part 37. The intermediate part 364 is connected to the tibial part 362 by means of the pivot 363. More precisely, the intermediate part 364 is connected to the second end 367 of the tibial part 362 by means of the pivot 363. The pivot 363 allows rotation of the intermediate part 364 relative to the tibial part 362 around an axis of rotation X3, during a movement of flexure/extension rotation of the foot of the user relative to the leg.

The intermediate part 364 is connected to the foot part 37 by means of the pivot 365. The pivot 365 is positioned at the back of the foot of the user, i.e. behind the heel. The pivot 365 allows rotation of the foot part 37 relative to the intermediate part 364 around an axis of rotation X2, during a pronation/supination movement of the foot of the user relative to the leg.

The foot part 37 is suitable for being fastened to the foot of the user. More precisely, the foot part 37 is suitable to be fastened to a right shoe 5 of the user, for example to the sole, so as to transfer the forces exerted on the exoskeleton structure 1 to the ground via the shoe 5.

The foot part 37 has two branches 371 and 372, suitable for extending on either side of the sole of the shoe 5. Each branch 371, 372 of the foot part 37 is fastened to the sole, for example by means of one or more fastening pins penetrating into the thickness of the sole.

The tibial part 362 can be formed in two portions 368, 369 mounted sliding relative to one another by means of a runner. The sliding of the portions 368 et 369 relative to one another allows shortening or lengthening of the tibial part 362 allowing the adjustment of the length of the tibial part 362 depending on the morphology of the user. The tibial part 362 can also comprise a locking device allowing locking the tibial part to the desired length.

As is visible in FIG. 1, the pivot 361 is positioned on one side of the leg part 35 so that the leg part 35 is located between a sagittal plane S of the user and the pivot 361.

In addition, the pivot 363 is positioned on one side of the foot of the user, near the malleolus. More precisely, the pivot 363 is positioned on one side of the intermediate part 364, so that the intermediate part 364 is located between the sagittal plane S of the user and the pivot 363.

The result is that the tibial part 362 extends on the external side of the user's leg (and not in front of the tibia). This allows designing a lightweight exoskeleton structure 1. Moreover, the exoskeleton structure 1 is easier to put on and to remove. It is sufficient for the user to put on or to remove his shoes, as he would normally do it, without the presence of the exoskeleton structure 1. Moreover, this allows freeing the space surrounding the ankle, and in particular the space situated on the internal side of the ankle, so as to limit the interference between the two leg assemblies.

As illustrated in FIG. 1, the second lower member assembly 4 is symmetric to the first lower member assembly 3. The second lower member assembly 4 is also connected to the lumbar belt 2 by means of a second hip pivot 41, symmetric with the first hip pivot 31. The second lower member assembly 4 extends along a second lower member of the user (in the example of FIG. 1, the second lower member assembly extends along the left lower member of the user).

The second lower member assembly 4 comprises parts identical to those of the first lower member assembly 3, but arranged symmetrically relative to the sagittal plane S of the user.

Thus, the second lower member assembly 4 comprises the second hip pivot 41, a second femoral part 42 suitable for extending along the left thigh of the user, a second thigh part 43 suitable for being fastened to the left thigh of the user, a second knee pivot 44, a second leg part 45 suitable for being fastened to the left leg of the user, a second mechanical linking assembly 46 and a second foot part 47 suitable for being fastened to the left foot of the user.

The second hip pivot 41 allows rotation of the second femoral part 42 relative to the lumbar belt 2 during a flexure/extension movement of the left thigh of the user relative to the pelvis.

The second lower member assembly 4 can further comprise a hip actuator, integrated with the hip pivot 41, comprising a stator and a rotor suitable for being driven in rotation relative to the stator to drive in rotation the tibial part 42 relative to the lumbar belt 2 during a flexure or extension movement of the hip.

The second knee pivot 44 connects the second femoral part 42 to the second leg part 45. The knee pivot 44 allows rotation of the leg part 45 relative to the femoral part 42 during a flexure/extension movement of the leg of the user relative to the thigh.

The second lower member assembly 4 can further comprise a knee actuator, integrated with the second knee pivot 44, comprising a stator and a rotor suitable for being driven in rotation relative to the stator to drive in rotation the leg part 45 relative the femoral part 42 during a flexure or extension movement of the knee.

As illustrated in FIG. 3, the second linking assembly 46 comprises a first pivot 461, a tibial part 462, a second pivot 463, an intermediate part 464 and a third pivot 465.

The tibial part 462 can be formed in two portions 468, 469 mounted sliding relative to one another by means of a runner. The sliding of the portions 468 and 469 relative to one another allows shortening or lengthening of the tibial part 462 allowing adjusting the length of the tibial part 362 depending on the morphology of the user. The tibial part 462 can also comprise a locking device allowing locking the tibial part to the desired length.

The second linking assembly 46 is arranged symmetrically with the first linking assembly 36, relative to the sagittal plane S.

In particular, as is visible in FIG. 1, the first pivot 461 is arranged on one side of the leg part 45 so that the leg part 45 is located between a sagittal plane S of the user and the first pivot 461.

In addition, the second pivot 463 is positioned on one side of the foot of the user, in proximity to the malleolus. More precisely, the second pivot 463 is positioned on one side of the intermediate part 464, so that the intermediate part 464 is located between the sagittal plane S of the user and the second pivot 463.

The result is that the tibial part 462 extends on the external side of the user's leg (and not in front of the tibia).

As illustrated in FIG. 2, the axis of rotation X1 of the pivot 361 is oriented so that it forms a first nonzero angle α relative to a vertical direction when the user is standing, in the anatomical reference position. The first angle α is comprised between 1 and 30 degrees, preferably between 10 and 15 degrees, for example approximately 12 degrees.

In the same manner, the axis of rotation X1 of the pivot 461 is also oriented so that it forms a first nonzero angle α relative to a vertical direction when the user is standing, in the anatomical reference position.

Moreover, as illustrate in FIGS. 2 and 3, the pivot 363 of the first linking assembly 3 and the pivot 463 of the second linking assembly 46 are positioned at a height less than the height of the malleoli of the user when the user is standing.

The axis of rotation X3 is oriented so that it forms a nonzero angle β with a transverse plane T of the user when the user is standing, in the anatomical reference position, the angle being comprised between 5 and 15 degrees, preferably between 6 and 8 degrees, for example approximately 8 degrees.

In addition, as illustrated in FIG. 4, the pivot 363 of the first linking assembly 36 is positioned toward the back of the foot of the user relative to the malleolus of the user. This arrangement allows minimizing the dimensions of the intermediate part and consequently making the exoskeleton structure lighter.

The pivot 463 of the second linking assembly 46 has an arrangement symmetrical to that of the pivot 363 of the first linking assembly 36 relative to the sagittal plane.

In addition, the axis of rotation X3 is oriented so that it forms a nonzero angle α with a frontal plane F of the user when the user is standing in the anatomical reference position, the angle being comprised between 1 and 15 degrees, preferably between 4 and 7 degrees, for example approximately 6 degrees.

The axis of rotation X3 passes over the axis of rotation X2, without intersection of the axes of rotation X3 and X2.

On the other hand, as illustrated in FIG. 4, both in the first linking assembly 36 and in the second linking assembly 46, the axis of rotation X1 intersects the axis of rotation X2.

As illustrated in FIG. 5, the axis of rotation X2 is oriented at a nonzero angle δ to a transverse plane T of the user when the user is standing, in the anatomical reference position, the angle being comprised between 1 and 30 degrees, preferably between 15 and 25 degrees, for example approximately 18 degrees.

The axis of rotation X2 is oriented downward when the axis of rotation X2 is followed from the back of the foot toward the front of the foot. This configuration has the advantage of procuring reinforced stability of the exoskeleton structure 1, even when the user is walking on irregular terrain, i.e. rough ground. In fact, if the user sets his foot on a rough feature, the point of application of the reaction force produced by the roughness on the sole of the shoe 6 will necessarily be located above the pronation/supination axis X2, so that the resulting moment will have the tendency to limit the rotation imposed on the ankle of the user. (On the contrary, in a structure where the axis of rotation X2 was located above the point of application of the reaction force produced by the roughness on the sole of the shoe 6, a resulting moment would be produced which would have the tendency to accentuate the rotation imposed on the ankle of the user).

The invention claimed is:

1. An exoskeleton structure comprising:
a leg part to be fastened to a leg of a user,
a foot part to be fastened to a foot of the user,
a mechanical linking assembly connecting the leg part to the foot part, and comprising a first pivot allowing rotation of the foot part relative to the leg part around a first axis of rotation during an internal/external rotation movement of the foot of the user, and a second pivot allowing rotation of the foot part relative to the leg part around a second axis of rotation during an eversion/inversion movement of an ankle of the user,
wherein the first pivot is arranged so that the first pivot is positioned on one side of the leg part, the leg part being located between a sagittal plane of the user and the first pivot, and the first pivot is positioned at a height greater than or equal to 20 centimeters from the ground when the user is standing, in an anatomical reference position, the first axis of rotation being oriented so that a distance between the first axis of rotation and the second axis of rotation is less than or equal to 5 centimeters, and
wherein the first axis of rotation is oriented so that the first axis of rotation forms a first nonzero angle relative to a vertical direction when the user is standing, in the anatomical reference position, the first nonzero angle being between 1 and 30 degrees.

2. The exoskeleton structure according to claim 1, wherein the first axis of rotation is oriented so that the first axis of rotation intersects the second axis of rotation.

3. The exoskeleton structure according to claim 1, wherein the mechanical linking assembly comprises a third pivot allowing rotation of the foot part relative to the leg part around a third axis of rotation during a flexure/extension movement of the ankle of the user.

4. The exoskeleton structure according to claim 3, wherein the third pivot is positioned at a height less than a height of a malleolus of the user when the user is standing, in the anatomical reference position.

5. The exoskeleton structure according to claim 3, wherein the third pivot is positioned toward a back of the foot of the user relative to a malleolus of the user.

6. The exoskeleton structure according to claim 3, wherein the first axis of rotation is oriented so that a distance between the first axis of rotation and the third axis of rotation is less than or equal to 5 centimeters.

7. The exoskeleton structure according to claim 3, wherein the first axis of rotation is oriented so that the first axis of rotation cuts the third axis of rotation.

8. The exoskeleton structure according to claim 3, wherein the third axis of rotation is oriented so that the third axis of rotation forms a second nonzero angle with a frontal plane of the user when the user is standing, in the anatomical reference position, the second nonzero angle being between 1 and 15 degrees.

9. The exoskeleton structure according to claim 3, wherein the third axis of rotation is oriented so that the third axis of rotation forms a third nonzero angle with a transverse plane of the user when the user is standing, in the anatomical reference position, the third nonzero angle being between 5 and 15 degrees.

10. The exoskeleton structure according to claim 3, wherein the mechanical linking assembly comprises a linking part having a first end connected to the leg part via the first pivot and a second end connected to the third pivot, the linking part comprising two portions mounted to slide relative to one another in order to adjust a length of the linking part, and a locking device to lock the two portions relative to one another once the length is adjusted.

11. The exoskeleton structure according to claim 1, wherein the second axis of rotation is oriented so that the second axis of rotation forms a fourth nonzero angle relative to a horizontal direction when the user is standing, in the anatomical reference position, the fourth nonzero angle being between 1 and 30 degrees.

12. The exoskeleton structure according to claim 1, wherein the second axis of rotation is oriented so that the second axis of rotation passes below a malleolus of the user when the user is standing, in the anatomical reference position.

13. The exoskeleton structure according to claim 1, wherein the second axis of rotation is oriented downward when the second axis of rotation is followed from the back of the foot toward the front of the foot of the user, when the user is standing, in the anatomical reference position.

14. The exoskeleton structure according to claim 1, wherein the first nonzero angle is between 10 and 15 degrees.

15. The exoskeleton structure according to claim 8, wherein the second nonzero angle is between 4 and 7 degrees.

16. The exoskeleton structure according to claim 9, wherein the third nonzero angle is between 6 and 8 degrees.

17. The exoskeleton structure according to claim 11, wherein the fourth nonzero angle is between 15 and 25 degrees.

18. An exoskeleton structure comprising:
a leg part to be fastened to a leg of a user,
a foot part to be fastened to a foot of the user,
a mechanical linking assembly connecting the leg part to the foot part, and comprising a first pivot allowing rotation of the foot part relative to the leg part around a first axis of rotation during an internal/external rotation movement of the foot of the user, a second pivot allowing rotation of the foot part relative to the leg part around a second axis of rotation during an eversion/ inversion movement of an ankle of the user, and a third pivot allowing rotation of the foot part relative to the leg part around a third axis of rotation during a flexure/extension movement of the ankle of the user, wherein the first pivot is arranged so that the first pivot is positioned on one side of the leg part, the leg part being located between a sagittal plane of the user and the first pivot, and the first pivot is positioned at a height greater than or equal to 20 centimeters from the ground when the user is standing, in an anatomical reference position, the first axis of rotation being oriented so that a distance between the first axis of rotation and the second axis of rotation is less than or equal to 5 centimeters, and wherein the third axis of rotation is oriented so that the third axis of rotation forms a second nonzero angle with a frontal plane of the user when the user is standing, in the anatomical reference position, the second nonzero angle being between 1 and 15 degrees.

19. The exoskeleton structure according to claim 18, wherein the second nonzero angle is between 4 and 7 degrees.

20. An exoskeleton structure comprising:
a leg part to be fastened to a leg of a user,
a foot part to be fastened to a foot of the user,
a mechanical linking assembly connecting the leg part to the foot part, and comprising a first pivot allowing rotation of the foot part relative to the leg part around a first axis of rotation during an internal/external rotation movement of the foot of the user, and a second pivot allowing rotation of the foot part relative to the leg part around a second axis of rotation during an eversion/inversion movement of an ankle of the user, wherein the first pivot is arranged so that the first pivot is positioned on one side of the leg part, the leg part being located between a sagittal plane of the user and the first pivot, and the first pivot is positioned at a height greater than or equal to 20 centimeters from the ground when the user is standing, in an anatomical reference position, the first axis of rotation being oriented so that a distance between the first axis of rotation and the second axis of rotation is less than or equal to 5 centimeters, and wherein the second axis of rotation is oriented so that the second axis of rotation forms a fourth nonzero angle relative to a horizontal direction when the user is standing, in the anatomical reference position, the fourth nonzero angle being between 1 and 30 degrees.

21. The exoskeleton structure according to claim 20, wherein the fourth nonzero angle is between 15 and 25 degrees.

* * * * *